(12) United States Patent
Chen et al.

(10) Patent No.: US 9,862,799 B2
(45) Date of Patent: Jan. 9, 2018

(54) POLYMER PARTICLE AND PREPARATION METHOD THEREOF

(71) Applicant: MAY-HWA ENTERPRISE CORPORATION, Taipei (TW)

(72) Inventors: Hsien-Yeh Chen, Taipei (TW); Hsin-Ying Ho, Taipei (TW); Ho-Yi Sun, Taipei (TW); Cheng-Yuan Fang, Taipei (TW)

(73) Assignee: MAY-HWA ENTERPRISE CORPORATION, Taipei (TW)

( * ) Notice: Subject to any disclaimer, the term of this patent is extended or adjusted under 35 U.S.C. 154(b) by 616 days.

(21) Appl. No.: 14/529,175

(22) Filed: Oct. 31, 2014

(65) Prior Publication Data

US 2015/0307653 A1  Oct. 29, 2015

(30) Foreign Application Priority Data

Apr. 24, 2014 (TW) .............................. 103114834 A

(51) Int. Cl.

| | |
|---|---|
| C08G 61/02 | (2006.01) |
| C08L 65/04 | (2006.01) |
| B01J 2/04 | (2006.01) |
| C08J 3/07 | (2006.01) |
| B29K 45/00 | (2006.01) |

(52) U.S. Cl.
CPC .............. *C08G 61/025* (2013.01); *B01J 2/04* (2013.01); *C08J 3/07* (2013.01); *C08L 65/04* (2013.01); *B29K 2045/00* (2013.01); *C08G 2261/11* (2013.01); *C08G 2261/143* (2013.01); *C08G 2261/1426* (2013.01); *C08G 2261/1428* (2013.01); *C08G 2261/3424* (2013.01); *C08G 2261/70* (2013.01)

(58) Field of Classification Search
None
See application file for complete search history.

(56) References Cited

U.S. PATENT DOCUMENTS

| 8,486,534 B2 | 7/2013 | Lellouche et al. | |
|---|---|---|---|
| 2006/0150901 A1* | 7/2006 | Lastow | ...................... B01J 2/04 118/621 |

(Continued)

FOREIGN PATENT DOCUMENTS

| EP | 2478872 | 7/2012 |
|---|---|---|
| JP | 2002012669 | 1/2002 |

OTHER PUBLICATIONS

Ho et al., "Fabrication of Functionalized Parylene particles Based on Electrospinning", TACT2013 International Thin Films Conference, Aug. 9, 2013.

(Continued)

*Primary Examiner* — Mary Lynn F Theisen
(74) *Attorney, Agent, or Firm* — JCIPRNET

(57) ABSTRACT

Provided is a poly-p-xylyene having at least one chemically active functional group present in a form of particles. In an embodiment, the functionalized poly-p-xylylene is synthesized via CVD, and electrospinning is then performed at a relatively low polymer concentration, so as to produce functionalized poly-p-xylyene particles. The functionalized poly-p-xylyene particles have a particle size at nano-scale or micro-scale. Such functionalized poly-p-xylyene particles can be applied to biological fields extensively.

14 Claims, 2 Drawing Sheets

(56) References Cited

U.S. PATENT DOCUMENTS

2008/0269456 A1* 10/2008 Lahann ................ C08G 61/025
528/212
2010/0210745 A1    8/2010 McDaniel et al.
2011/0293832 A1* 12/2011 Gersdorff ................ B05D 1/60
427/255.28

OTHER PUBLICATIONS

Jin et al., "Preparation of poly-KVE prodrug loaded by polyvinyl pyrrolidone nanoparticles and its controlled drug release", New Chemical Materials, Oct. 2013, pp. 144-146.

Liu et al., "Application Progress of High Voltage Electrostatic Spray Technology in Drug Microcapsule Preparation", Technology & Development of Chemical Industry, Jan. 2013 , pp. 21-23.

Li et al., "The preparation of the magnetic core-shell composite nanoparticles by electrospray and the application on protein imprinted polymer", Master Thesis of Department of Chemical Engineering, National Cheng Kung University, Jul. 2008 , pp. 1-152.

"Office Action of Taiwan Counterpart Application", dated Jan. 9, 2015, p. 1-p. 7.

Ho et al., "Fabrication of Functionalized Parylene Particles Based on Electrospinning," AIChE Annual Meeting, Nov. 3-8, 2013.

* cited by examiner

POLYMER PARTICLE AND PREPARATION METHOD THEREOF

CROSS-REFERENCE TO RELATED APPLICATION

This application claims the priority benefit of Taiwan application serial no. 103114834, filed on Apr. 24, 2014. The entirety of the above-mentioned patent application is hereby incorporated by reference herein and made a part of this specification.

BACKGROUND OF THE INVENTION

Field of the Invention

The invention relates to a biomedical material and a preparation method thereof, and more particularly, to a polymer particle and a preparation method thereof.

Description of Related Art

Modern trends in biotechnology fields, such as biomaterials, biosensors, biochips, microfluidics, drug delivery, tissue engineering, cellular biology, and regenerative medicine, have targeted controlled designs to mimic and to respond to a biological environment on a molecular scale. The key factor for deciding the long-term performance and the high efficiency of a biomaterial is in the surface modification of a biological substrate.

In recent years, most surface modifications of biological substrates are performed in a form of a thin film, and no literature yet provides performing surface modification in a form of particles. However, with the rapid change in biotechnology, a polymer particle suitable for a biological field is deeply desired to significantly increase the feasibility and the extensiveness of surface modification.

SUMMARY OF THE INVENTION

Accordingly, the invention provides a polymer particle suitable for surface modification and used as a biomedical material.

The invention further provides a preparation method of a polymer particle. The steps of the method are simple and the method can be performed in a mild environment.

The invention provides a polymer particle which includes a poly-p-xylyene in particle form having at least one chemically active functional group, wherein the poly-p-xylyene has a particle size at nano-scale or micro-scale.

In an embodiment of the invention, the poly-p-xylyene has the following structure:

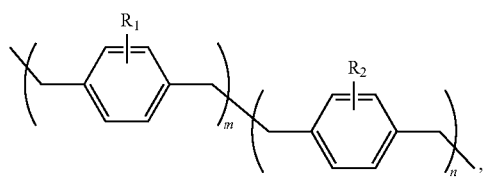

wherein $R_1$ and $R_2$ are each independently selected from the group consisting of a hydrogen atom, —C(=O)H, —C(=O)—CFH$_2$, —C(=O)—CF$_3$, —C(=O)—C$_2$F$_5$, —C(=O)—C$_8$F$_{17}$, —C(=O)—OH, —C(=O)-Ph, —C≡CH, —CH=CH$_2$, —CH$_2$—OH, —CH$_2$—NH$_2$, —NH$_2$, —C(=O)—O—CH$_3$, —C(=O)—O—C$_2$H$_5$, —CH$_2$—O—C(=O)—C—(CH$_3$)$_2$Br, —CH$_2$—O—C(=O)—C≡CH, a group represented by formula 1-1, a group represented by formula 1-2, and a group represented by formula 1-3, and $R_1$ and $R_2$ are not a hydrogen atom at the same time; and m and n are each independently an integer of 1 to 750,000:

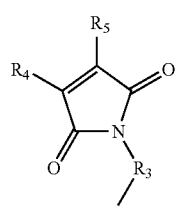

formula 1-1

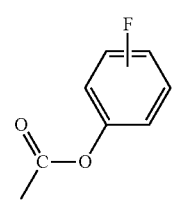

formula 1-2

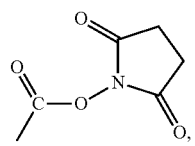

formula 1-3 wherein in formula 1-1, $R_3$ represents —CH$_2$—, —CH$_2$—CH$_2$—OC(=O)—, —CH$_2$—CH$_2$—NH—C(=O)—, —C(=O)—, or —O—CH$_2$—; and $R_4$ and $R_5$ each independently represent a hydrogen atom, a methyl group, or a chlorine atom.

In an embodiment of the invention, the poly-p-xylyene has a structure represented by formula 3-1, formula 3-2, or formula 3-3:

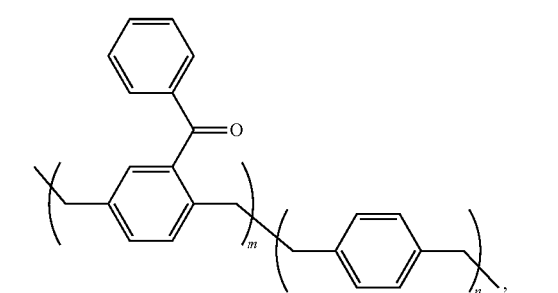

formula 3-1

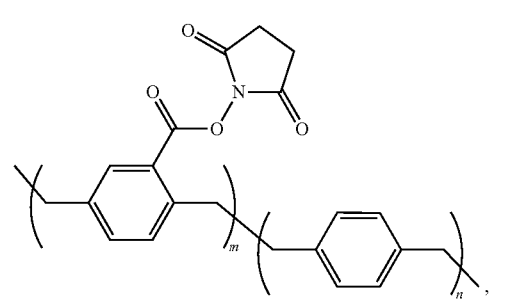

formula 3-2 formula 3-3

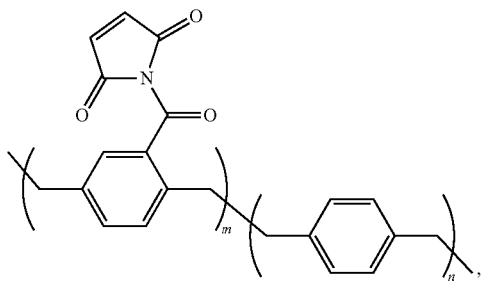

wherein m and n are each independently an integer of 1 to 750,000.

In an embodiment of the invention, the particle size is from about 10 nm to about 20 μm.

In an embodiment of the invention, the particle shape of the poly-p-xylene is a solid spheroid, a hollow spheroid, a core-shell spheroid, an ellipsoid, a teardrop, or a dumbbell.

The invention further provides a preparation method of a polymer particle. The method includes the following steps. First, a poly-p-xylene thin film having at least one chemically active functional group is dissolved in a solvent to form a polymer solution. Then, the polymer solution is sprayed on a collection plate via an electrostatic spraying method to obtain a poly-p-xylene particle having the chemically active functional group on the collection plate.

In an embodiment of the invention, the solvent includes ketone, chlorinated hydrocarbon, ether, alcohol, ester, or a combination thereof.

In an embodiment of the invention, the solvent includes acetone, chloroform, dimethyl formamide, or a combination thereof.

In an embodiment of the invention, the concentration of the polymer solution is about 0.1 wt % to about 5 wt %.

In an embodiment of the invention, the process parameters of the electrostatic spraying method include: a voltage difference of about 10 kV to about 20 kV between a needle tip and the collection plate, a speed of about 1 ml/h to about 6 ml/h of a syringe pump, and a distance of about 5 cm to about 20 cm between the needle tip and the collection plate.

In an embodiment of the invention, the poly-p-xylene particle has the following structure:

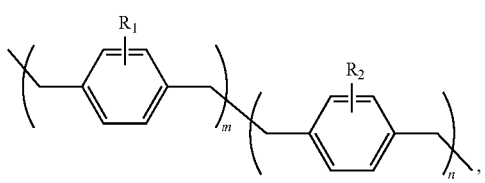

wherein $R_1$ and $R_2$ are each independently selected from the group consisting of a hydrogen atom, —C(=O)H, —C(=O)—CFH$_2$, —C(=O)—CF$_3$, —C(=O)—C$_2$F$_5$, —C(=O)—C$_8$F$_{17}$, —C(=O)—OH, —C(=O)-Ph, —C≡CH, —CH=CH$_2$, —CH$_2$—OH, —CH$_2$—NH$_2$, —NH$_2$, —C(=O)—O—CH$_3$, —C(=O)—O—C$_2$H$_5$, —CH$_2$—O—C(=O)—C—(CH$_3$)$_2$Br, —CH$_2$—O—C(=O)—C≡CH, a group represented by formula 1-1, a group represented by formula 1-2, and a group represented by formula 1-3, and $R_1$ and $R_2$ are not a hydrogen atom at the same time; and m and n are each independently an integer of 1 to 750,000:

formula 1-1

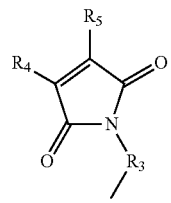

formula 1-2

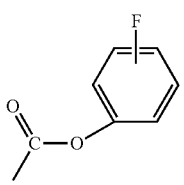

formula 1-3

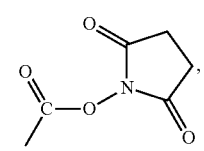

wherein in formula 1-1, $R_3$ represents —CH$_2$—, —CH$_2$—CH$_2$—OC(=O)—, —CH$_2$—CH$_2$—NH—C(=O)—, —C(=O)—, or —O—CH$_2$—; and $R_4$ and $R_5$ each independently represent a hydrogen atom, a methyl group, or a chlorine atom.

In an embodiment of the invention, the poly-p-xylene particle has a particle size at nano-scale or micro-scale.

In an embodiment of the invention, the particle size is from about 10 nm to about 20 μm.

In an embodiment of the invention, the shape of the poly-p-xylene particle is a solid spheroid, a hollow spheroid, a core-shell spheroid, an ellipsoid, a teardrop, or a dumbbell.

In an embodiment, the method further includes forming the poly-p-xylene thin film with the following steps. First, a paracyclophane having the chemically active functional group is deposited on a substrate surface via chemical vapor deposition (CVD), such that the poly-p-xylene thin film is polymerized on the substrate surface. Then, the poly-p-xylene thin film is torn from the substrate surface.

In an embodiment of the invention, the paracyclophane has the following structure:

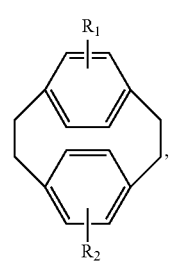

wherein $R_1$ and $R_2$ are each independently selected from the group consisting of a hydrogen atom, —C(=O)H, —C(=O)—CFH$_2$, —C(=O)—CF$_3$, —C(=O)—C$_2$F$_5$, —C(=O)—C$_8$F$_{17}$, —C(=O)—OH, —C(=O)-Ph, —C≡CH, —CH=CH$_2$, —CH$_2$—OH, —CH$_2$—NH$_2$, —NH$_2$, —C(=O)—O—CH$_3$, —C(=O)—O—C$_2$H$_5$, —CH$_2$—O—C(=O)—C—(CH$_3$)$_2$Br, —CH$_2$—O—C(=O)—C≡CH, a group represented by formula 1-1, a group represented by formula 1-2, and a group represented by formula 1-3, and $R_1$ and $R_2$ are not a hydrogen atom at the same time; and m and n are each independently an integer of 1 to 750,000:

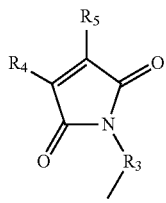

formula 1-1

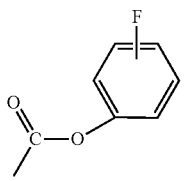

formula 1-2

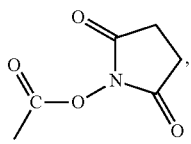

formula 1-3 wherein in formula 1-1, $R_3$ represents —$CH_2$—, —$CH_2$—$CH_2$—OC(=O)—, —$CH_2$—$CH_2$—NH—C(=O)—, —C(=O)—, or —O—$CH_2$—; and $R_4$ and $R_5$ each independently represent a hydrogen atom, a methyl group, or a chlorine atom.

In an embodiment of the invention, the paracyclophane has a structure represented by formula 2-1, formula 2-2, or formula 2-3:

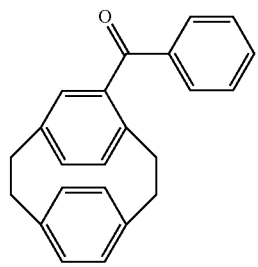

formula 2-1

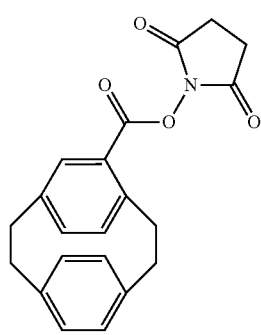

formula 2-2

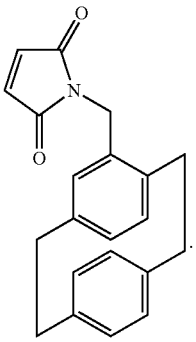

formula 2-3

In an embodiment of the invention, the CVD is performed at a temperature of about 0° C. to about 35° C.

In an embodiment of the invention, the substrate is rotated during the CVD.

Based on the above, the invention provides for the first time a functionalized poly-p-xylyene in particle form and a preparation method thereof, thus breaking the old concept of the public that poly-p-xylyene can only be used as a coating film. The functionalized poly-p-xylyene particle itself is highly biocompatible and does not need additional modification. At the same time, the specific functional group or the chemically active functional group of the poly-p-xylyene particle can be used to bond a drug molecule or a target molecule for targeted therapy. In other words, the poly-p-xylyene particle prepared in the invention can significantly increase the feasibility and the extensiveness of surface modification in a biological field.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
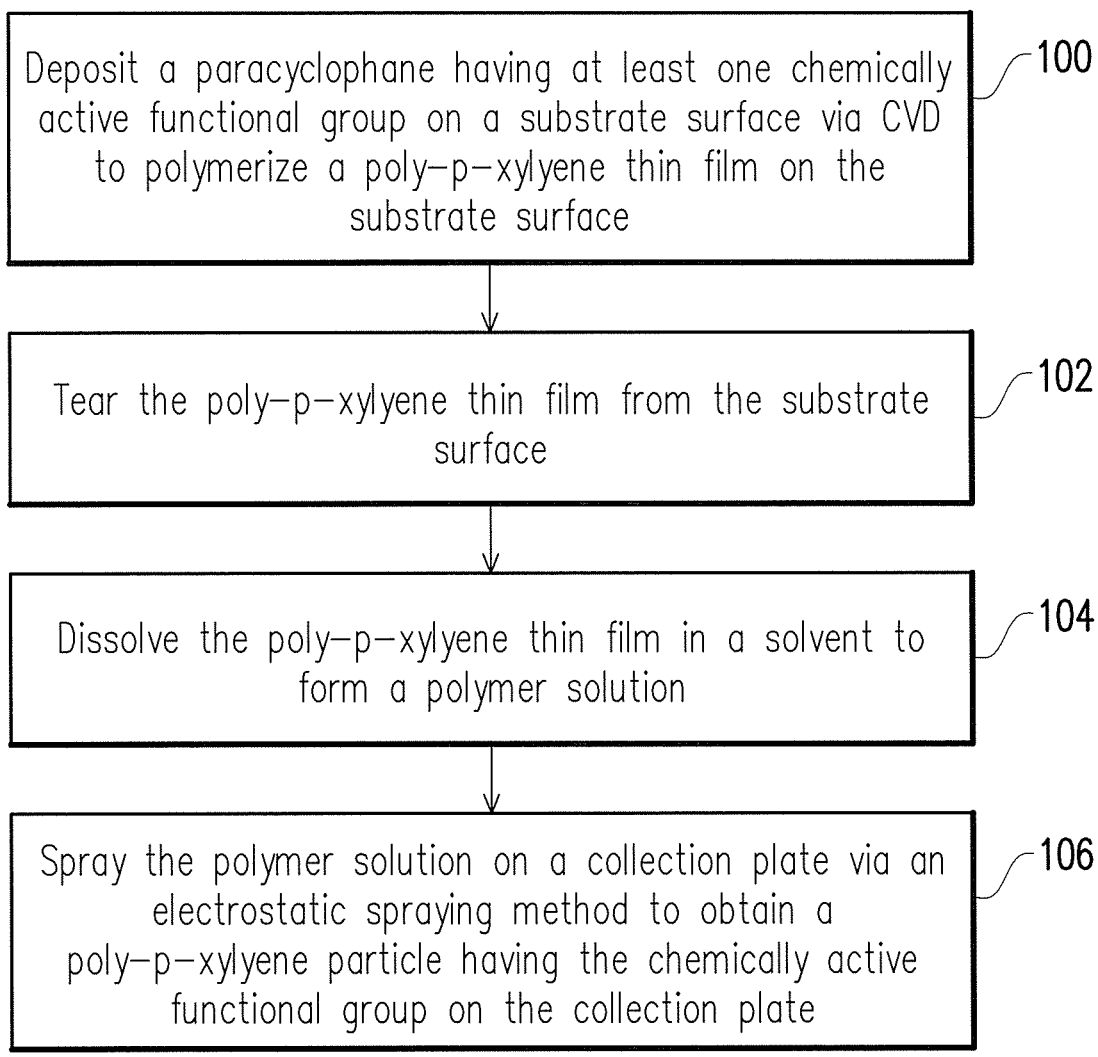
FIG. 1 is a flow chart of a preparation method of a polymer particle according to an embodiment of the invention.
Figure 2:
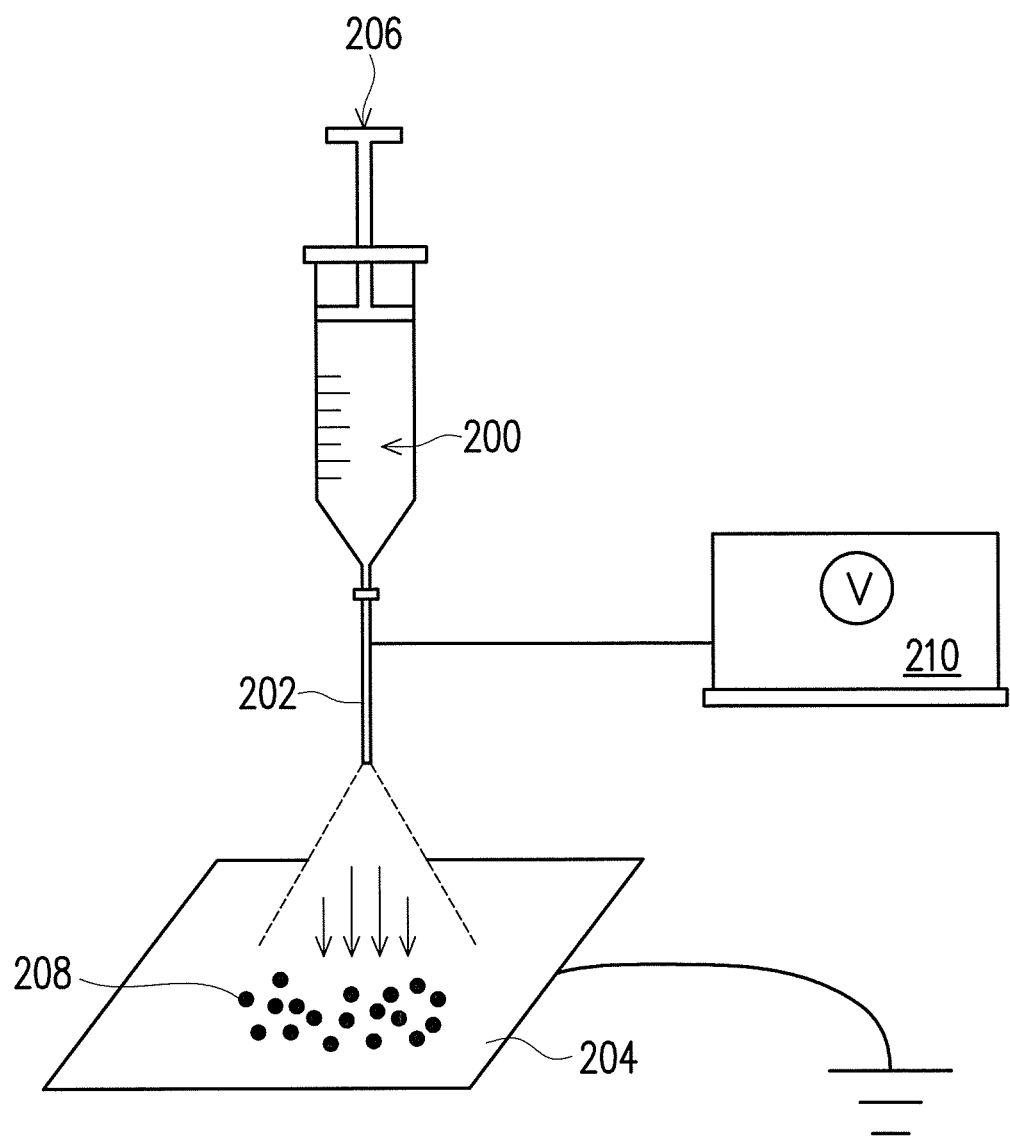
FIG. 2 is a schematic diagram of a preparation method of a polymer particle according to an embodiment of the invention.

FIG. 1 is a flow chart of a preparation method of a polymer particle according to an embodiment of the invention. FIG. 2 is a schematic diagram of a preparation method of a polymer particle according to an embodiment of the invention.

Referring to FIG. 1, a step 100 is performed, in which a paracyclophane having at least one chemically active functional group is deposited on a substrate surface via chemical vapor deposition (CVD), such that a poly-p-xylyene thin film is polymerized on the substrate surface.

In the present specification, the term "chemically active functional group" represents a specific functional group capable of reacting with a biological molecule or a drug molecule. In an embodiment, the chemically active functional group can include, for instance: a functional group having an unsaturated bond (such as a double bond or a triple bond), a functional group having an amino group (—$NH_2$), a functional group having a hydroxyl group (—OH), or a functional group having a carboxyl group (—COOH).

The paracyclophane can have the following structure:

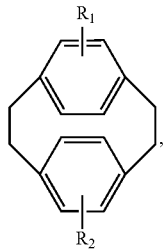

wherein $R_1$ and $R_2$ are each independently selected from the group consisting of a hydrogen atom, —C(=O)H, —C(=O)—$CFH_2$, —C(=O)—$CF_3$, —C(=O)—$C_2F_5$, —C(=O)—$C_8F_{17}$, —C(=O)—OH, —C(=O)-Ph, —C≡CH, —CH=$CH_2$, —$CH_2$—OH, —$CH_2$—$NH_2$, —$NH_2$, —C(=O)—O—$CH_3$, —C(=O)—O—$C_2H_5$, —$CH_2$—O—C(=O)—C—$(CH_3)_2$Br, —$CH_2$—O—C(=O)—C≡CH, a group represented by formula 1-1, a group represented by formula 1-2, and a group represented by formula 1-3, and $R_1$ and $R_2$ are not a hydrogen atom at the same time; and m and n are each independently an integer of 1 to 750,000:

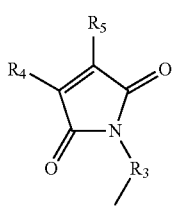

formula 1-1 formula 1-2

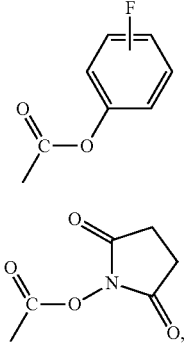

formula 1-3 wherein in formula 1-1, $R_3$ represents —$CH_2$—, —$CH_2$—$CH_2$—OC(=O)—, —$CH_2$—$CH_2$—NH—C(=O)—, —C(=O)—, or —O—$CH_2$—; and $R_4$ and $R_5$ each independently represent a hydrogen atom, a methyl group, or a chlorine atom.

In the present specification, "-Ph" represents a phenyl group having a general formula of —$C_6H_5$.

In an embodiment, the paracyclophane can have a structure represented by formula 2-1, formula 2-2, or formula 2-3:

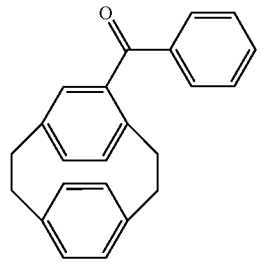

formula 2-1

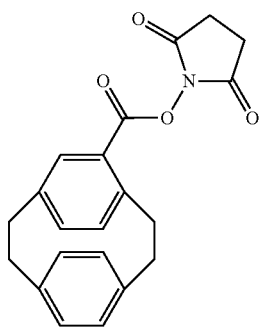

formula 2-2

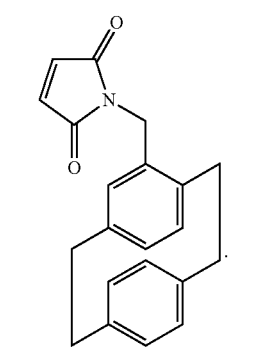

formula 2-3

The synthesized poly-p-xylyene thin film can have, for instance, the following structure:

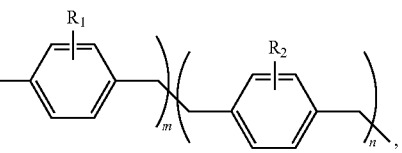

wherein $R_1$ and $R_2$ are each independently selected from the group consisting of a hydrogen atom, —C(=O)H, —C(=O)—$CFH_2$, —C(=O)—$CF_3$, —C(=O)—$C_2F_5$, —C(=O)—$C_8F_{17}$, —C(=O)—OH, —C(=O)-Ph, —C≡CH, —CH=$CH_2$, —$CH_2$—OH, —$CH_2$—$NH_2$, —$NH_2$, —C(=O)—O—$CH_3$, —C(=O)—O—$C_2H_5$, —$CH_2$—O—C(=O)—C—$(CH_3)_2$Br, —$CH_2$—O—C(=O)—C≡CH, a group represented by formula 1-1, a group represented by formula 1-2, and a group represented by formula 1-3, and $R_1$ and $R_2$ are not a hydrogen atom at the same time; and m and n are each independently an integer of 1 to 750,000:

formula 1-1

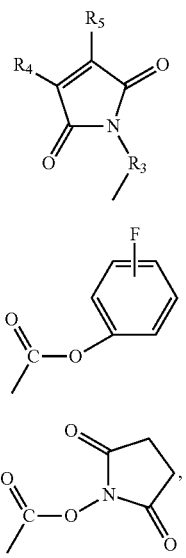

formula 1-2 formula 1-3 wherein in formula 1-1, $R_3$ represents —$CH_2$—, —$CH_2$—$CH_2$—OC(=O)—, —$CH_2$—$CH_2$—NH—C(=O)—, —C(=O)—, or —O—$CH_2$—; and $R_4$ and $R_5$ each independently represent a hydrogen atom, a methyl group, or a chlorine atom.

Moreover, the poly-p-xylyene thin film can be a random copolymer. In an embodiment, the molar ratio of m and n can be about 1:1. The molar ratio can be adjusted as needed.

In an embodiment, the poly-p-xylyene thin film can have a structure represented by formula 3-1, formula 3-2, or formula 3-3:

formula 3-1

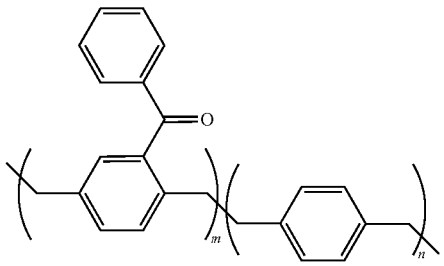

formula 3-2

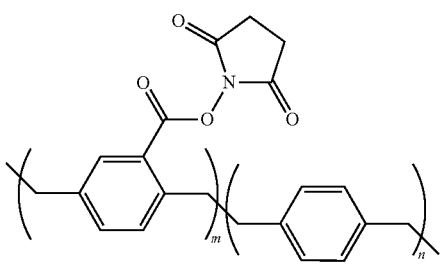

formula 3-3

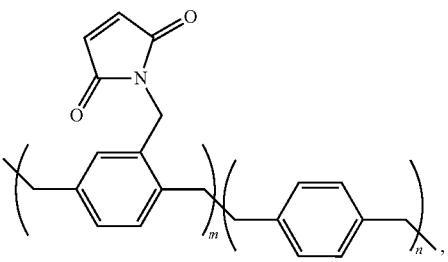

wherein m and n are each independently an integer of 1 to 750,000.

In an embodiment, the substrate includes silicon, glass, a metal, or a polymer. More specifically, the metal includes titanium (Ti), silver (Ag), or gold (Au). The polymer includes poly(methyl methacrylate) (PMMA) or polystyrene.

Moreover, the CVD can be performed at a pressure of about 0.1 mbar to about 0.3 mbar. The CVD can be performed at a substrate temperature of about −30° C. to about 40° C., preferably about 0° C. to about 35° C. The CVD can be performed at a deposition rate of about 0.3 Å/s to about 1.0 Å/s. Moreover, an initiator, a catalyst, and a solvent are not needed to perform the CVD, thereby reducing environmental pollution. Moreover, when the CVD is performed, the substrate can be rotated to more uniformly form a thin film on the substrate. The deposition thickness of the thin film is about 2 μm to about 20 μm. The deposition thickness of the thin film cannot be too small or too large. When the thickness is too small, the thin film cannot be readily torn; and when the thickness is too large, the thin film cannot be readily dissolved in a solvent.

Still referring to FIG. 1, a step 102 is performed to tear the poly-p-xylyene thin film from the substrate surface. Here, the poly-p-xylyene thin film can be torn from the substrate by hand or with a tool.

Then, referring to FIG. 1 and FIG. 2 at the same time, a step 104 is performed, in which the poly-p-xylyene thin film is dissolved in a solvent to form a polymer solution 200. The solvent includes ketone, chlorinated hydrocarbon, ether, alcohol, ester, or a combination thereof. In an embodiment, the solvent includes acetone, chloroform, dimethyl formamide (DMF), or a combination thereof. The polymer solution 200 has a concentration of about 0.1 wt % to about 5 wt %.

Continue referring to FIG. 1 and FIG. 2, a step 106 is performed, in which the polymer solution 200 is sprayed on a collection plate 204 via an electrostatic spraying method to obtain poly-p-xylyene particles 208 each having the chemically active functional group on the collection plate 204.

In the electrostatic spraying method, the voltage difference between a needle tip 202 and the collection plate 204 is about 10 kV to about 20 kV. For instance, a high-voltage supply 210 can apply a voltage of about 10 kV to about 20 kV to the needle tip 202, and the collection plate 204 can be grounded. The speed of a syringe pump 206 can be about 1 ml/h to about 6 ml/h. The distance between the needle tip 202 and the collection plate 204 can be about 5 cm to about 20 cm.

The size, uniformity, shape and the like of the polymer particle can be easily controlled by appropriately adjusting each of the said parameters of the electrostatic spraying method. The poly-p-xylyene particles 208 can have a particle size at nano-scale or micro-scale. In an embodiment, the particle size is from about 10 nm to about 20 μm. In another embodiment, the particle size is from about 10 nm to about 200 nm. Besides, the shape of the poly-p-xylyene particles 208 can be a solid spheroid, a hollow spheroid, a core-shell spheroid, an ellipsoid, a teardrop, or a dumbbell. The shape of the poly-p-xylyene particles 208 can also be substantially the same or different.

In the above embodiments, a functionalized poly-p-xylyene particle is prepared as an example, but the invention is not limited thereto. It is appreciated by people having ordinary skill in the art that, when provided with suitable CVD parameters, a suitable solvent for dissolving a thin film, and suitable electrostatic spraying parameters, the steps 100 to 106 of the invention are also suitable for preparing other biocompatible polymer particles.

The invention further provides a poly-p-xylyene particle having the same composition as the said poly-p-xylyene thin film, and the two are only different in form. Specifically, the former has a particle form at nano-scale or micro-scale while the latter has a form of a thin film.

Specifically, the poly-p-xylyene particle can have the following structure:

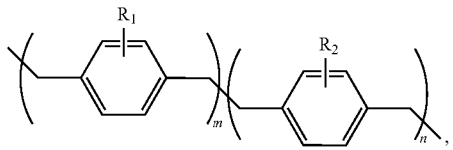

wherein the definition of each of $R_1$ and $R_2$ is the same as above and is not repeated herein.

In an embodiment, the poly-p-xylyene particle can have a structure represented by formula 3-1, formula 3-2, or formula 3-3 above.

In the invention, the prepared poly-p-xylyene particle can be used as a biomedical material. For instance, the poly-p-xylyene particle of the invention can be used for oral administration or injection. The application of nanotechnology in drug delivery has flourished in recent years. In particular, the method for delivering a drug to a specific tissue mainly uses, for instance, a nanoparticle, a nanocapsule, or a micellar system. The poly-p-xylyene particle of the invention is nano-scale, and has various advantages when applied in drug delivery. For instance, the poly-p-xylyene particle can improve biological activity when a drug is taken orally, maintain the efficacy of the drug in the target tissue, effectively stabilize the drug during delivery, and lower the degree of dissolution of the drug by an enzyme. Therefore, the poly-p-xylyene particle can produce unexpected result. Since the size of a nanoparticle is extremely small, the nanoparticle can penetrate into a deep tissue and be more readily phagocytized by a cell. Moreover, the surface of the poly-p-xylyene particle of the invention can also be grafted with a ligand having biological specificity capable of delivering a drug to a specific location.

Moreover, the chemically active functional group of the poly-p-xylyene particle can be used to react with a biological molecule or a drug molecule. In an embodiment, the biological molecule or the drug molecule includes deoxyribonucleic acid (DNA), ribonucleic acid (RNA), protein, amino acid, growth factor, oligosaccharide, or hormone. Moreover, the biological molecule or the drug molecule can also have a specific functional group after being altered or modified, wherein the specific functional group can react with a chemically active functional group of the poly-p-xylyene particle. Moreover, the reaction performed on the chemically active functional group and the biological molecule includes, for instance, immobilizing the biological molecule through a bonding method. More specifically, the chemically active functional group of the poly-p-xylyene particle and the specific functional group of the biological molecule can be conjugated or bonded through a coupling reaction.

In the following, several examples are numerated to more specifically explain the invention. However, the invention is not limited to the examples.

EXAMPLE 1

First, a paracyclophane having the structure of formula (2-1) was provided, and a poly-p-xylylene thin film having the structure of formula (3-1) was polymerized via CVD. Then, the poly-p-xylylene thin film having the structure of formula (3-1) was torn off and dissolved in DMF to form a polymer solution. Next, the polymer solution was placed in a 5 ml syringe, a stainless steel #19 needle was attached to the syringe, and the solution was discharged at a rate of 2 ml/hr to 5 ml/hr. At the same time, a high voltage of 15 kV to 20 kV was applied to the needle tip, and a collection plate was provided at a working distance of 5 cm to 15 cm, wherein the collection plate was grounded. Upon the experiment, poly-p-xylyene particles having the structure of formula (3-1) were collected on the collection plate, wherein the particle size thereof was 10 nm to 20 μm.

EXAMPLE 2

First, a paracyclophane having the structure of formula (2-2) was provided, and a poly-p-xylylene thin film having the structure of formula (3-2) was polymerized via CVD. Then, the poly-p-xylylene thin film having the structure of formula (3-2) was torn off and dissolved in DMF to form a polymer solution. Next, the polymer solution was placed in a 5 ml syringe, a stainless steel #19 needle was attached to the syringe, and the solution was discharged at a rate of 2 ml/hr to 5 ml/hr. At the same time, a high voltage of 15 kV to 20 kV was applied to the needle tip, and a collection plate was provided at a working distance of 5 cm to 15 cm, wherein the collection plate was grounded. Upon the experiment, a poly-p-xylyene particles having the structure of formula (3-2) were collected on the collection plate, wherein the particle size thereof was 10 nm to 20 μm.

EXAMPLE 3

First, a paracyclophane having the structure of formula (2-3) was provided, and a poly-p-xylylene thin film having the structure of formula (3-3) was polymerized via CVD. Then, the poly-p-xylylene thin film having the structure of formula (3-3) was torn off and dissolved in DMF to form a polymer solution. Next, the polymer solution was placed in a 5 ml syringe, a stainless steel #19 needle was attached to the syringe, and the solution was discharged at a rate of 2 ml/hr to 5 ml/hr. At the same time, a high voltage of 15 kV to 20 kV was applied to the needle tip, and a collection plate was provided at a working distance of 5 cm to 15 cm, wherein the collection plate was grounded. Upon the experiment, a poly-p-xylyene particles having the structure of formula (3-3) were collected on the collection plate, wherein the particle size thereof was 10 nm to 20 μm.

Based on the above, the invention provides for the first time a functionalized poly-p-xylyene in particle form and a preparation method thereof. As a result, the application field of the poly-p-xylyene is no longer limited to the use of a coating film. In fact, known methods of manufacturing a polymer particle, such as emulsion polymerization, microemulsion polymerization, precipitation polymerization, suspension polymerization, or seeded polymerization, are not suitable for the synthesis of a functionalized poly-p-xylyene particle. In the invention, through steps including CVD, dissolution and electrostatic spraying, a poly-p-xylyene particle can be successfully prepared, and the size, uniformity, shape and the like thereof can also be easily controlled. As a result, customer needs can be met, and the feasibility and the extensiveness of surface modification in a biological field can be significantly increased.

Moreover, the prepared functionalized poly-p-xylyene particle itself is highly biocompatible and does not need additional modification. At the same time, the specific functional group or the chemically active functional group of the poly-p-xylyene particle can be used to bond a drug molecule or a target molecule for targeted therapy.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A preparation method of a polymer particle, comprising:
    dissolving a poly-p-xylyene thin film having at least one chemically active functional group in a solvent to form a polymer solution; and
    spraying the polymer solution on a collection plate via an electrostatic spraying method to obtain a poly-p-xylyene particle having the chemically active functional group on the collection plate.

2. The method of claim 1, wherein the solvent comprises ketone, chlorinated hydrocarbon, ether, alcohol, ester, or a combination thereof.

3. The method of claim 1, wherein the solvent comprises acetone, chloroform, dimethyl formamide, or a combination thereof.

4. The method of claim 1, wherein the polymer solution has a concentration of 0.1 wt % to 5 wt %.

5. The method of claim 1, wherein process parameters of the electrostatic spraying method comprise: a voltage difference of 10 kV to 20 kV between a needle tip and the collection plate, a speed of 1 ml/h to 6 ml/h of a syringe pump, and a distance of 5 cm to 20 cm between the needle tip and the collection plate.

6. The method of claim 1, wherein the poly-p-xylyene particle has a following structure:

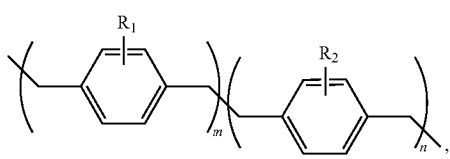

wherein $R_1$ and $R_2$ are each independently selected from the group consisting of a hydrogen atom, —C(=O)H, —C(=O)—CFH$_2$, —C(=O)—CF$_3$, —C(=O)—C$_2$F$_5$, —C(=O)—C$_8$F$_{17}$, —C(=O)—OH, —C(=O)—Ph, —C≡CH, —CH=CH$_2$, —CH$_2$—OH, —CH$_2$—NH$_2$, —NH$_2$, —C(=O)—O—CH$_3$, —C(=O)—O—C$_2$H$_5$, —CH$_2$—O—C(=O)—C—(CH$_3$)$_2$Br, —CH$_2$—O—C(=O)—C≡CH, a group represented by formula 1-1, a group represented by formula 1-2, and a group represented by formula 1-3, and $R_1$ and $R_2$ are not a hydrogen atom at the same time; and m and n are each independently an integer of 1 to 750,000:

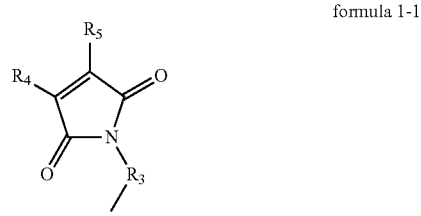

formula 1-1

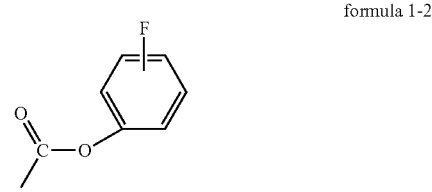

formula 1-2

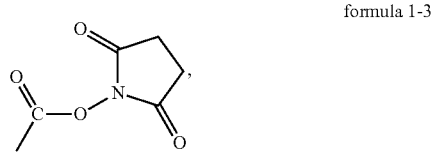

formula 1-3 wherein in formula 1-1, $R_3$ represents —CH$_2$—, —CH$_2$—CH$_2$—OC(=O)—, —CH$_2$—CH$_2$—NH—C(=O)—, —C(=O)—, or —O—CH$_2$—; and $R_4$ and $R_5$ each independently represent a hydrogen atom, a methyl group, or a chlorine atom.

7. The method of claim 1, wherein the poly-p-xylyene particle has a particle size at nano-scale or micro-scale.

8. The method of claim 7, wherein the particle size is from 10 nm to 20 μM.

9. The method of claim 1, wherein a shape of the poly-p-xylyene particle is a solid spheroid, a hollow spheroid, a core-shell spheroid, an ellipsoid, a teardrop, or a dumbbell.

10. The method of claim 1, further comprising forming the poly-p-xylyene thin film, wherein the step of forming the poly-p-xylyene thin film comprises:
    depositing a paracyclophane having the chemically active functional group on a surface of a substrate via chemical vapor deposition (CVD), such that the poly-p-xylyene thin film is polymerized on the surface of the substrate; and
    tearing the poly-p-xylyene thin film from the surface of the substrate.

11. The method of claim 10, wherein the paracyclophane has a following structure:

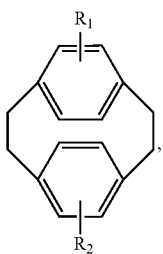

wherein $R_1$ and $R_2$ are each independently selected from the group consisting of a hydrogen atom, —C(=O)H, —C(=O)—CFH$_2$, —C(=O)—CF$_3$, —C(=O)—C$_2$F$_5$, —C(=O)—C$_8$F$_{17}$, —C(=O)—OH, —C(=O)—Ph, —C≡CH, —CH=CH$_2$, —CH$_2$—OH, —CH$_2$—NH$_2$, —NH$_2$, —C(=O)—O—CH$_3$, —C(=O)—O—C$_2$H$_5$, —CH$_2$—O—C(=O)—C(CH$_3$)$_2$Br, —CH$_2$—O—C(=O)—C≡CH, a group represented by formula 1-1, a group represented by formula 1-2, and a group represented by formula 1-3, and $R_1$ and $R_2$ are not a hydrogen atom at the same time; and m and n are each independently an integer of 1 to 750,000:

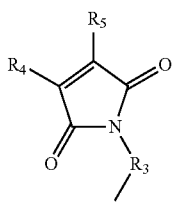

formula 1-1

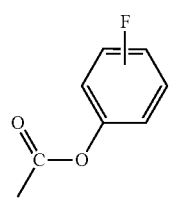

formula 1-2

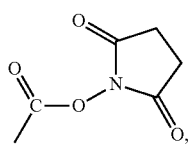

formula 1-3 wherein in formula 1-1, $R_3$ represents —CH$_2$—, —CH$_2$—CH$_2$—OC(=O)—, —CH$_2$—CH$_2$—NH—C(=O)—, —C(=O)—, or —O—CH$_2$—; and $R_4$ and $R_5$ each independently represent a hydrogen atom, a methyl group, or a chlorine atom.

12. The method of claim 10, wherein the paracyclophane has a structure represented by formula 2-1, formula 2-2, or formula 2-3:

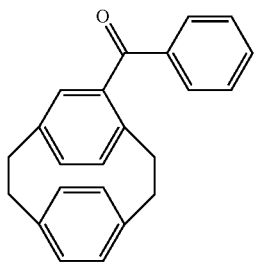

formula 2-1

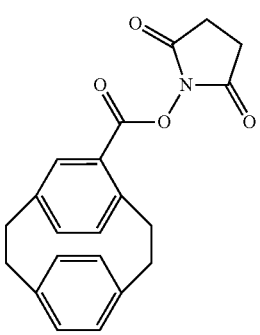

formula 2-2

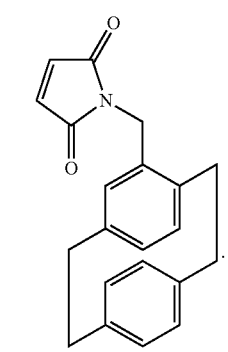

formula 2-3

13. The method of claim 10, wherein the CVD is performed at a temperature of 0° C. to 35° C.

14. The method of claim 10, wherein the substrate is rotated during the CVD.

* * * * *